United States Patent
Oh et al.

(10) Patent No.: US 10,622,882 B2
(45) Date of Patent: Apr. 14, 2020

(54) CONTROL OF POWER CONVERSION DEVICE FOR DECREASING TOTAL HARMONIC DISTORTION

(71) Applicant: KOREA INSTITUTE OF ENERGY RESEARCH, Daejeon (KR)

(72) Inventors: Seaseung Oh, Daejeon (KR); Suyong Chae, Daejeon (KR); Yujin Song, Daejeon (KR); Jongbok Baek, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 16/299,801

(22) Filed: Mar. 12, 2019

(65) Prior Publication Data

US 2020/0091814 A1     Mar. 19, 2020

(30) Foreign Application Priority Data

Sep. 18, 2018 (KR) .......................... 10-2018-0111254
Nov. 16, 2018 (KR) .......................... 10-2018-0141841

(51) Int. Cl.
*H02M 1/12* (2006.01)

(52) U.S. Cl.
CPC .................................. *H02M 1/12* (2013.01)

(58) Field of Classification Search
CPC .......... H02M 1/00; H02M 1/088; H02M 1/12; H02M 7/48; H02M 7/00; H02M 7/487; H02M 7/493; H02M 7/5387; H02M 7/155; H02M 3/28285; H02M 3/1584; H02M 3/335; H02M 3/33507; H02M 3/33592; H02M 2001/008; G05F 1/40; G05F 1/10

See application file for complete search history.

(56) References Cited

U.S. PATENT DOCUMENTS

| 5,917,719 A * | 6/1999 | Hoffman | H02J 1/00 363/124 |
| 2016/0193158 A1 * | 7/2016 | Luhman | A61K 31/045 514/738 |

FOREIGN PATENT DOCUMENTS

| JP | 2004-96903 A | 2/2016 |
| KR | 10-2011-0031838 A | 3/2011 |
| KR | 10-2014-0096627 A | 8/2014 |
| KR | 10-2016-0014894 A | 2/2016 |

(Continued)

*Primary Examiner* — Jue Zhang
*Assistant Examiner* — Nusrat Quddus
(74) *Attorney, Agent, or Firm* — Birch, Stewart, Kolasch & Birch, LLP

(57) ABSTRACT

The present disclosure relates to frequency control of power conversion modules for decreasing THD (Total Harmonic Distortion) in a power conversion device in which a plurality of power conversion modules operate in parallel. In one aspect of the present disclosure, an embodiment provides a power conversion device comprising a plurality of power conversion modules being connected in parallel to receive input power and provide output AC power, and a frequency controller controlling each operating frequency of the plurality of power conversion modules, wherein, the frequency controller may include a function as a first frequency regulating step for regulating each operating frequency of the plurality of power conversion modules, so that the operating frequencies of the plurality of power conversion modules have a specific relationship with each other.

21 Claims, 14 Drawing Sheets

(56) References Cited

FOREIGN PATENT DOCUMENTS

| KR | 10-2017-0027178 A | 3/2017 |
|---|---|---|
| WO | WO 2017/039090 A1 | 3/2017 |

\* cited by examiner

FIG.3

| Number of operated module | Operating Frequency | THD |
|---|---|---|
| 1 | fpwm1 = 1.8kHz | 12% |
| 2 | fpwm1 = 1.8kHz<br>fpwm2 = 1.68kHz | 8% |

FIG.4

| Number of operated module | Difference between Operating Frequencies (fpwm1 − fpwm2) | THD |
|---|---|---|
| 2 | 60Hz | 13.5% |
| 2 | 120Hz | 8.0% |
| 2 | 180Hz | 14.6% |

FIG.5

| Power Conversion Module | Operating Frequency (case 1) | Operating Frequency (case 2) |
|---|---|---|
| #1 | fpwm1 | fpwm1 |
| #2 | fpwm1 − 2*fac | fpwm1 − 2*fac |
| #3 | fpwm1 | fpwm1 − 2*fac |

FIG.6

| Power Conversion Module | Operating Frequency (case 3) | Operating Frequency (case 4) |
|---|---|---|
| #1 | fpwm1 | fpwm1 |
| #2 | fpwm1 + 2*fac | fpwm1 + 2*fac |
| #3 | fpwm1 | fpwm1 + 2*fac |

FIG. 7

| Power Conversion Module | Operating Frequency (case 5) | Operating Frequency (case 6) |
|---|---|---|
| #1 | fpwm1 | fpwm1 |
| #2 | fpwm1 − 2*fac | fpwm1 + 2*fac |
| #3 | fpwm1 | fpwm1 |
| #4 | fpwm1 − 2*fac | fpwm1 + 2*fac |

FIG. 8

| Power Conversion Module | Operating Frequency (case 7) | Operating Frequency (case 8) |
|---|---|---|
| #1 | fpwm1 | fpwm1 |
| #2 | fpwm1 − 2∗fac | fpwm1 + 2∗fac |
| #3 | fpwm1 | fpwm1 |
| #4 | fpwm1 − 2∗fac | fpwm1 + 2∗fac |
| #5 | fpwm1 or fpwm1 − 2∗fac | fpwm1 or fpwm1 + 2∗fac |

FIG.9

| Power Conversion Module | Operating Frequency (case 9) | Operating Frequency (case 10) |
|---|---|---|
| #1 | fpwm1 | fpwm1 |
| #2 | fpwm1 − 4∗fac | fpwm1 + 4∗fac |
| #3 | fpwm1 | fpwm1 |
| #4 | fpwm1 − 4∗fac | fpwm1 + 4∗fac |
| #5 | fpwm1 or fpwm1 − 4∗fac | fpwm1 or fpwm1 + 4∗fac |

CONTROL OF POWER CONVERSION DEVICE FOR DECREASING TOTAL HARMONIC DISTORTION

CROSS REFERENCE TO RELATED APPLICATION

This application claims priority from Korean Patent Application No. 10-2018-0141841, filed on Nov. 16, 2018, and No. 10-2018-0111254, filed on Sep. 18, 2018, which are hereby incorporated by reference for all purposes as if fully set forth herein.

BACKGROUND OF THE INVENTION

1. Field of the Invention

The present disclosure relates to a control of power conversion device. More specifically, the present disclosure relates to frequency control of power conversion modules for decreasing THD (Total Harmonic Distortion) in a power conversion device in which a plurality of power conversion modules operate in parallel.

2. Description of the Prior Art

A power conversion device including a plurality of power conversion modules which are operated in parallel is widely used. A power conversion device in which a plurality of power conversion modules are operated in parallel has advantages such as high efficiency, increase of redundancy, and easy expandability according to a module configuration.

A power conversion device in which a plurality of power conversion modules are operated in parallel has various advantages as described above, but there are also cautions in designing. Each of the plurality of power conversion modules causes a distortion of a current or a voltage waveform in operation of PWM (Pulse Width Modulation), and the THD of power conversion device can be increased when the distortion caused by a plurality of power conversion modules is combined with each other.

When the THD of the power conversion device is increased, it may cause a problem like increase of the volume and weight of the device such as a filter for decreasing harmonics and high cost. It is desirable to decrease the THD of the power conversion device by appropriately controlling the operation of the plurality of power conversion modules internally, so that the size of the harmonic decrease device can be minimized or diminished.

SUMMARY OF THE INVENTION

The present disclosure is to improve the THD of a power conversion device in which a plurality of power conversion modules operate in parallel.

In one aspect of the present disclosure, an embodiment provides a power conversion device comprising a plurality of power conversion modules being connected in parallel to receive input power and provide output AC power, and a frequency controller controlling each operating frequency of the plurality of power conversion modules, wherein, the frequency controller may include a function as a first frequency regulating step for regulating each operating frequency of the plurality of power conversion modules, so that the operating frequencies of the plurality of power conversion modules have a specific relationship with each other.

For the power conversion device according to the embodiment of the present disclosure, in the first frequency regulating step, the frequency controller may regulate the difference among the operating frequencies of the plurality of power conversion modules so as to be m times (m=0, 2, 4, . . . ) the frequency of the output AC power, wherein the difference between operating frequencies of at least two power conversion modules among the plurality of power conversion modules is not zero.

For the power conversion device according to the embodiment of the present disclosure, in the first frequency regulating step, the frequency controller may regulate the difference between the operating frequencies of the at least two power conversion modules among plurality of the power conversion modules so as to be 2 times the frequency of the output AC power.

For the power conversion device according to the embodiment of the present disclosure, in the first frequency regulating step, the frequency controller may regulate each of the plurality of power conversion modules to be operated at any one of a first operating frequency or a second operating frequency, and the difference between the first operating frequency and the second operating frequency to be 2 times the frequency of the output AC power.

For the power conversion device according to the embodiment of the present disclosure, when there are n (n=even) number of power conversion modules, the frequency controller may control n/2 of the plurality of power conversion modules to be operated at the first operating frequency, and the remaining n/2 of the plurality of power conversion modules to be operated at the second operating frequency.

For the power conversion device according to the embodiment of the present disclosure, when there are n (n=odd) number of power conversion modules, the frequency controller may control (n−1)/2 of the plurality of power conversion modules to be operated at the first operating frequency, other (n−1)/2 of the plurality of power conversion modules to be operated at the second operating frequency, and the remaining one to be operated at the first operating frequency or second operating frequency.

For the power conversion device according to the embodiment of the present disclosure, the frequency controller may set the highest operating frequency among the operating frequencies of the plurality of power conversion modules as a first operating frequency before the first frequency regulating step, and sets the second operating frequency to be lower than the first operating frequency by 2 times the frequency of the output AC power.

For the power conversion device according to the embodiment of the present disclosure, the frequency controller may set the lowest operating frequency among the operating frequencies of the plurality of power conversion modules as a first operating frequency before the first frequency regulating step, and sets the second operating frequency to be higher than the first operating frequency by 2 times the frequency of the output AC power.

For the power conversion device according to the embodiment of the present disclosure, the frequency controller may include a function as a second frequency regulating step which is performed by obtaining information for a voltage or a current of the output AC power, calculating a THD (Total Harmonic Distortion) of the voltage or the current, and finely regulating each operating frequency of the plurality of power conversion modules to decrease the calculated THD.

For the power conversion device according to the embodiment of the present disclosure, a variation of the operating frequency of each power conversion module by the second frequency regulating step may be in a frequency range within ½ or ¼ of the frequency of the output AC power.

In one aspect of the present disclosure, another embodiment provides a frequency controller controlling each operating frequency of a plurality of power conversion modules connected in parallel which receive input power and supply output AC power, wherein the frequency controller, comprising an information obtainer obtaining information for the output AC power, and a frequency regulator performing a first frequency regulating step for regulating each operating frequency of the plurality of power conversion modules so that each operating frequency of the plurality of power conversion modules have a specific relationship with each other.

For the frequency controller according to the embodiment of the present disclosure, in the first frequency regulating step, the frequency regulator may regulate the difference among the operating frequencies of the plurality of power conversion modules so as to be m times (m=0, 2, 4, ...) the frequency of the output AC power, wherein the difference between operating frequencies of at least two power conversion modules among the plurality of power conversion modules is not zero.

For the frequency controller according to the embodiment of the present disclosure, in the first frequency regulating step, the frequency regulator may regulate the difference between the operating frequencies of the at least two power conversion modules among plurality of the power conversion modules so as to be 2 times the frequency of the output AC power.

For the frequency controller according to the embodiment of the present disclosure, in the first frequency regulating step, the frequency regulator may regulate each of the plurality of power conversion modules to be operated at any one of a first operating frequency or a second operating frequency, and the difference between the first operating frequency and the second operating frequency to be 2 times the frequency of the output AC power.

For the frequency controller according to the embodiment of the present disclosure, when there are n (n=even) number of power conversion modules, the frequency regulator may regulate n/2 of the plurality of power conversion modules to be operated at the first operating frequency, and the remaining n/2 of the plurality of power conversion modules to be operated at the second operating frequency.

For the frequency controller according to the embodiment of the present disclosure, when there are n (n=odd) number of power conversion modules, the frequency regulator may regulate (n−1)/2 of the plurality of power conversion modules to be operated at the first operating frequency, other (n−1)/2 of the plurality of power conversion modules to be operated at the second operating frequency, and the remaining one to be operated at the first operating frequency or second operating frequency.

For the frequency controller according to the embodiment of the present disclosure, the frequency regulator may include a function as a second frequency regulating step which is performed by obtaining information for a voltage or a current of the output AC power, calculating the THD (Total Harmonic Distortion) of the voltage or the current, and finely regulating each operating frequency of the plurality of power conversion modules to decrease the calculated THD.

In one aspect of the present disclosure, another embodiment provides a method for controlling operating frequencies of a plurality of power conversion modules by a frequency controller connected in parallel which receive input power and supply output AC power, comprised of performing a first frequency regulating step for controlling each of the plurality of power conversion modules to be operated at either first operating frequency or second operating frequency, and performing a second frequency regulating step for obtaining information for a voltage or a current of the output AC power, calculating a THD (Total Harmonic Distortion) of the voltage or the current, and finely regulating each operating frequency of the plurality of power conversion modules to decrease the calculated THD, wherein, the difference between the first operating frequency and the second operating frequency is 2 times the frequency of the output AC power.

For the method for controlling operating frequencies according to the embodiment of the present disclosure, in the first frequency regulating step, the frequency controller may set the highest operating frequency among the operating frequencies of the plurality of power conversion modules as a first operating frequency before the first frequency regulating step, and sets the second operating frequency to be lower than the first operating frequency by 2 times the frequency of the output AC power.

For the method for controlling operating frequencies according to the embodiment of the present disclosure, in the first frequency regulating step, the frequency controller may set the lowest operating frequency among the operating frequencies of the plurality of power conversion modules as a first operating frequency before the first frequency regulating step, and sets the second operating frequency to be higher than the first operating frequency by 2 times the frequency of the output AC power.

For the method for controlling operating frequencies according to the embodiment of the present disclosure, a variation of the operating frequency of each power conversion module by the second frequency regulating step is in a frequency range within ½ or ¼ of the frequency of the output AC power.

According to the present disclosure, the THD of a power conversion device in which a plurality of power conversion modules operate in parallel can be improved.

BRIEF DESCRIPTION OF THE DRAWINGS

FIGS. 3 and 4 illustrate the THD decrease effect when the operating frequencies of the two power conversion modules are set according to an embodiment of the present disclosure.

FIGS. 5 and 6 illustrate a setting of the operating frequency when three power conversion modules are used.

FIG. 7 illustrates a setting of the operating frequency when four power conversion modules are used.

FIGS. 8 and 9 illustrate a setting of the operating frequency when five power conversion modules are used.

DETAILED DESCRIPTION OF THE EXEMPLARY EMBODIMENTS

Figure 1:
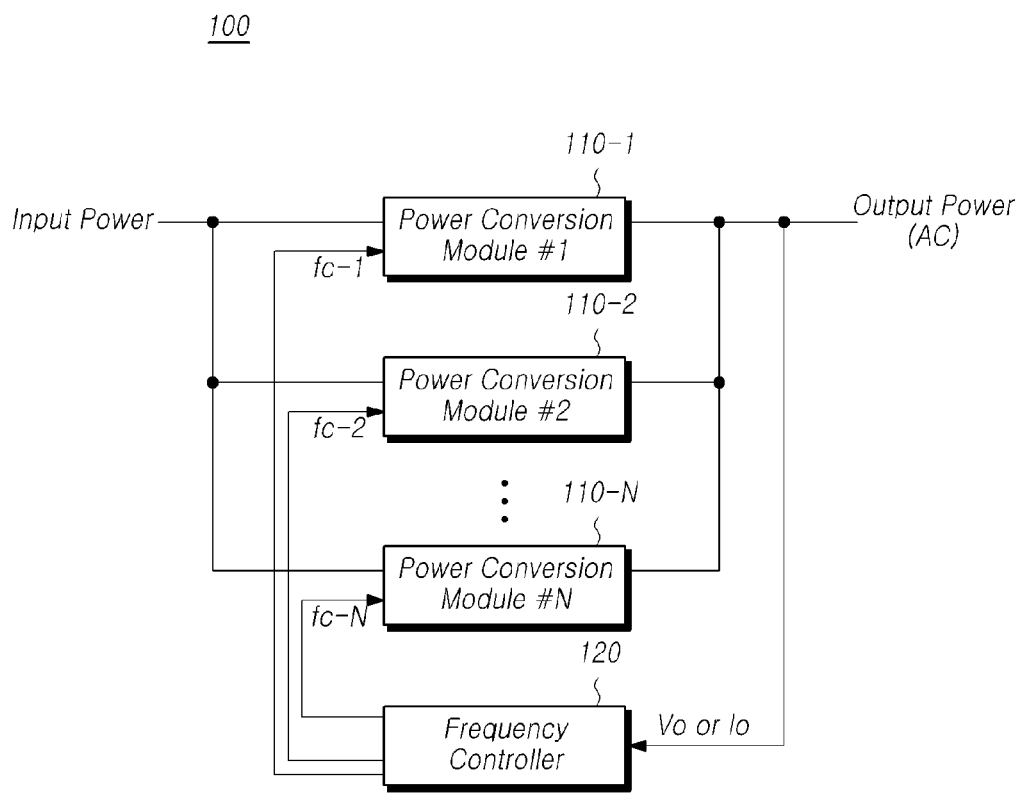
FIG. 1 illustrates a power conversion device according to an embodiment of the present disclosure.

Hereinafter, embodiments of the present disclosure will be described in detail with reference to the accompanying drawings. In adding reference numerals to elements in each drawing, the same elements will be designated by the same reference numerals, if possible, although the elements are shown in different drawings. Further, in the following description of the present disclosure, a detailed description of known elements and functions incorporated herein will be omitted when it is determined that the description may make the subject matter of the present disclosure rather unclear.

In addition, when describing elements of the present disclosure, terms such as first, second, A, B, (a), (b), and the like may be used. These terms are only used to distinguish one element from another element, and these are not intended to limit the essence, order, or sequence of the corresponding element. It will be understood that when an element is referred to as being "linked to," "coupled to," or "connected to" another element, it may be directly connected or coupled to another element, but one of more intervening element may be "linked," "coupled," or "connected" between each element.

FIG. 1 shows an example of a power conversion device 100 according to an embodiment of the present disclosure.

Referring to FIG. 1, the power conversion device 100 may include a plurality of power conversion module 110-1-110-N and a frequency controller 120.

The plurality of power conversion modules 110-1-110-N may be connected in parallel to receive input power and provide output power. Each of the plurality of power conversion modules 110-1-110-N may be implemented with a conventional converter or inverter.

The input power may be DC or AC. The output power may be AC. Because the power conversion device of this embodiment outputs an AC power, it will be referred to as an output AC power in this description.

A parallel connection of a plurality of power conversion modules 110-1-110-N may means that the plurality of power conversion modules 110-1-110-N share an input terminal (not shown in FIG) for providing input power, and an output terminal (not shown in FIG) for providing an output AC power. The output AC power may be supplied directly to the load for consuming the power or may be supplied to the load through another power conversion device. When the power conversion device 100 supplies the output AC power to the other power conversion device or the load at the subsequent stage, it is desirable to supply the output AC power with a less THD. The power conversion device 100 according to the present embodiment can improve the THD of the output AC power as described below.

The frequency controller 120 may control each operating frequency of the plurality of power conversion modules 110-1-110-N. The operating frequency may be a PWM (Pulse Width Modulation) frequency that each of the plurality of power conversion modules 110-1-110-N uses to adjust its output.

The frequency controller 120 may obtain information for the voltage Vo or the current Io of the output AC power, perform an internal process, and then output operating frequency control signals fc-1-fc-N for controlling the operating frequencies of the each power conversion module 110-1-110-N, in order to control operating frequencies of the plurality of power conversion modules 110-1 to 110-N, respectively. Each of the plurality of power conversion modules 110-1-110-N may set its own operating frequency based on the operating frequency control signals fc-1-fc-N received from the frequency controller 120.

The frequency controller 120 may obtain information for the voltage Vo or current Io of the output AC power from a voltage sensor or a current sensor. Conventional sensors may be used for the voltage sensor or the current sensor. The information for the voltage Vo may be detected from the common terminal of the output AC power. The information for the current Io may be detected from total output current of the power conversion device (i.e., the current that is a combination of the output currents from the plurality of power conversion modules 110-1-110-N).

The frequency controller 120 may include a function as a first frequency regulating step for regulating each operating frequency of the plurality of power conversion modules 110-1-110-N, so that the operating frequencies of the plurality of power conversion modules 110-1-110 have a specific relationship with each other. Here, the context that the operating frequencies of the plurality of power conversion modules 110-1-110-N have a specific relationship with each other may mean that the operating frequencies of the plurality of power conversion modules 110-1-110-N are not set independently and individually.

Also, the frequency controller 120 may include a function as a second frequency regulating step which is performed by obtaining information for the voltage Vo or the current Io of the output AC power, calculating the THD (Total Harmonic Distortion) of the voltage Vo or the current Io, and finely regulating each operating frequency of the plurality of power conversion modules 110-1-110-N.

For example, in the first frequency regulating step, the frequency controller 120 may regulate the difference among the operating frequencies of the plurality of power conversion modules 110-1-110-N so as to be m times (m=0, 2, 4, . . . ) the frequency of the output AC power, wherein the difference between operating frequencies of at least two power conversion modules among the plurality of power conversion modules 110-1-110-N may not be zero.

For example, in the first frequency regulating step, the frequency controller 120 may regulate the difference between the operating frequencies of the at least two power conversion modules among plurality of the power conversion modules 110-1-110-N so as to be 2 times the frequency of the output AC power.

For example, in the first frequency regulating step, the frequency controller 120 may regulate each of the plurality of power conversion modules 110-1-110-N to be operated at any one of a first operating frequency or a second operating frequency, and the difference between the first operating frequency and the second operating frequency to be even times the frequency of the output AC power. Preferably, the difference between the first operating frequency and the second operating frequency may be 2 times the frequency of the output AC power.

For example, when there are n (n=even) number of power conversion modules 110-1-110-N, the frequency controller 120 may control n/2 of the plurality of power conversion modules 110-1-110-N to be operated at the first operating frequency, and the remaining n/2 of the plurality of power conversion modules 110-1-110-N to be operated at the second operating frequency.

For example, when there are n (n=odd) number of power conversion modules 110-1-110-N, the frequency controller

120 may control (n−1)/2 of the plurality of power conversion modules 110-1-110-N to be operated at the first operating frequency, other (n−1)/2 of the plurality of power conversion modules 110-1-110-N to be operated at the second operating frequency, and the remaining one to be operated at the first operating frequency or second operating frequency.

The method for controlling each operating frequency of the plurality of power conversion modules 110-1-110-N by the frequency controller 120 will be described in detail below.

Figure 2:
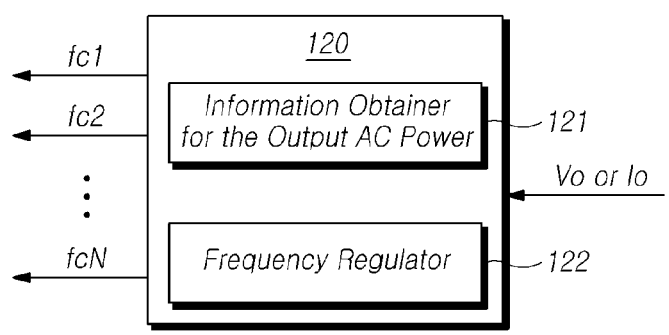
FIG. 2 illustrates a frequency controller according to an embodiment of the present disclosure.

FIG. 2 illustrates a frequency controller 120 according to an embodiment of the present disclosure.

Referring to FIG. 2, the frequency controller 120 may include an information obtainer for the output AC power 121 and a frequency regulator 122. The frequency controller 120 may control operating frequencies of a plurality of power conversion modules connected in parallel which receive input power and supply output AC power.

The information obtainer for the output AC power 121 may obtain the information for the output AC power. As described above, the information obtainer for the output AC power 121 may obtain the information for the voltage Vo or the current Io of the output AC power from a voltage sensor or a current sensor. The information for the voltage Vo may be detected from the common terminal of the output AC power, and the information for the current Io may be detected from total output current of the power conversion device.

The frequency regulator 122 may perform a first frequency regulating step for regulating each operating frequency of the plurality of power conversion modules so that each operating frequency of the plurality of power conversion modules have a specific relationship with each other. The frequency regulator 122 may calculate THD (Total Harmonic Distortion) of the voltage Vo or the current Io, and perform a second frequency regulating step for finely regulating each operating frequency of the plurality of power conversion modules 110-1-110-N so as to decrease the calculated THD.

FIGS. 3 and 4 illustrate the THD decrease effect when the operating frequencies of the two power conversion modules are set according to an embodiment of the present disclosure.

Referring to FIG. 3, when the number of operated power conversion module is one and the operating frequency of the power conversion module fpwm1 is 1.8 kHz, the THD is measured to be about 12%. On the other hand, when the number of operated power conversion module is 2, the operating frequency of the first power conversion module fpwm1 is 1.8 kHz and the operating frequency of the second power conversion module fpwm2 is 1.68 kHz, the THD is measured to be about 8%. That is, when the difference between the operating frequencies of the two power conversion modules is 120 Hz (2 times the frequency of the output AC power), the THD can be improved compared to using one power conversion module.

FIG. 4 illustrates the THD by differently setting the difference between the operating frequencies of the two power conversion modules when two power conversion modules are used. When the difference between the operating frequencies of the two power conversion modules is 60 Hz (that is, the difference between the operating frequencies is equal to the frequency of the output AC power) the THD is about 13.5%, when the difference between the operating frequencies of the two power conversion modules is 120 Hz (that is, the difference between the operating frequencies is 2 times the frequency of the output AC power) the THD is about 8.0%, and when the difference between the operating frequencies of the two power conversion modules is 180 Hz (that is, the difference between the operating frequencies is triple the frequency of the output AC power) the THD is about 14.6%. Accordingly, when two power conversion modules are used and the difference between the operating frequencies is set to be 2 times the frequency of output AC power, THD can be improved. However, it can be seen that THD can be worse rather than using one power conversion module when the difference between the operating frequencies is not set moderately even though two power conversion modules are used. In this embodiment, the THD of the power conversion device can be improved by setting the difference between the operating frequencies of the plurality of power conversion modules to even times the frequency of output AC power based on the above described experimental results.

FIGS. 5 and 6 illustrate a setting of the operating frequency when three power conversion modules are used.

Referring to FIG. 5, as an embodiment (case 1), an operating frequency of first power conversion module #1 may be set to a first operating frequency fpwm1, an operating frequency of second power conversion module #2 may be set to a second operating frequency (fpwm1−2*fac) lower than the operating frequency of the first power conversion module #1 by 2 times (2*fac) the frequency of the output AC power, and an operating frequency of third power conversion module #3 may be set to the first operating frequency fpwm1 equal to the operating frequency of the first power conversion module.

As another embodiment (case 2), an operating frequency of first power conversion module #1 may be set to an first operating frequency fpwm1, an operating frequency of second power converting module #2 may be set to a second operating frequency (fpwm1−2*fac), and an operating frequency of third power conversion module #3 may be set to a second operating frequency (fpwm1−2*fac) equal to the operating frequency of the second power conversion module.

Referring to FIG. 6, as another embodiment (case 3), an operating frequency of first power conversion module #1 may be set to a first operating frequency fpwm1, an operating frequency of second power conversion module #2 may be set to a second operating frequency (fpwm1+2*fac) higher than the operating frequency of the first power conversion module #1 by 2 times (2*fac) the frequency of the output AC power, and an operating frequency of third power conversion module #3 may be set to the first operating frequency fpwm1 equal to the operating frequency of the first power conversion module.

As another embodiment (case 4), an operating frequency of first power conversion module #1 may be set to an first operating frequency fpwm1, an operating frequency of second power converting module #2 may be set to a second operating frequency (fpwm1+2*fac), and an operating frequency of third power conversion module #3 may be set to a second operating frequency (fpwm1+2*fac) equal to the operating frequency of the second power conversion module.

FIG. 7 illustrates a setting of the operating frequency when four power conversion modules are used.

Referring to FIG. 7, as an embodiment (case 5), an operating frequency of first power conversion module #1 may be set to a first operating frequency fpwm1, an operating frequency of second power conversion module #2 may be set to a second operating frequency (fpwm1−2*fac) lower than the operating frequency of the first power conversion module #1 by 2 times (2*fac) the frequency of the output AC power, an operating frequency of third power conversion module #3 may be set to the first operating frequency fpwm1 equal to the operating frequency of the first power conversion module, and an operating frequency of fourth power conversion module #4 may be set to the second operating frequency (fpwm1−2*fac) equal to the operating frequency of the second power conversion module.

As another embodiment (case 6), an operating frequency of first power conversion module #1 may be set to a first operating frequency fpwm1, an operating frequency of second power conversion module #2 may be set to a second operating frequency (fpwm1+2*fac) higher than the operating frequency of the first power conversion module #1 by 2 times (2*fac) the frequency of the output AC power, an operating frequency of third power conversion module #3 may be set to the first operating frequency fpwm1 equal to the operating frequency of the first power conversion module, and an operating frequency of fourth power conversion module #4 may be set to the second operating frequency (fpwm1+2*fac) equal to the operating frequency of the second power conversion module.

FIGS. 8 and 9 illustrate a setting of the operating frequency when five power conversion modules are used.

Referring to FIG. 8, as an embodiment (case 7), an operating frequency of first power conversion module #1 may be set to a first operating frequency fpwm1, an operating frequency of second power conversion module #2 may be set to a second operating frequency (fpwm1−2*fac) lower than the operating frequency of the first power conversion module #1 by 2 times (2*fac) the frequency of the output AC power, an operating frequency of third power conversion module #3 may be set to the first operating frequency fpwm1 equal to the operating frequency of the first power conversion module, an operating frequency of fourth power conversion module #4 may be set to the second operating frequency (fpwm1−2*fac) equal to the operating frequency of the second power conversion module, and an operating frequency of fifth power conversion module #5 may be set to the first operating frequency fpwm1 equal to the operating frequency of the first power conversion module or the second operating frequency (fpwm1−2*fac) equal to the operating frequency of the second power conversion module.

As another embodiment (case 8), an operating frequency of first power conversion module #1 may be set to a first operating frequency fpwm1, an operating frequency of second power conversion module #2 may be set to a second operating frequency (fpwm1+2*fac) higher than the operating frequency of the first power conversion module #1 by 2 times (2*fac) the frequency of the output AC power, an operating frequency of third power conversion module #3 may be set to the first operating frequency fpwm1 equal to the operating frequency of the first power conversion module, an operating frequency of fourth power conversion module #4 may be set to the second operating frequency (fpwm1+2*fac) equal to the operating frequency of the second power conversion module, and an operating frequency of fifth power conversion module #5 may be set to the first operating frequency fpwm1 equal to the operating frequency of the first power conversion module or the second operating frequency (fpwm1+2*fac) equal to the operating frequency of the second power conversion module.

Referring to FIG. 9, as an embodiment (case 9), an operating frequency of first power conversion module #1 may be set to a first operating frequency fpwm1, an operating frequency of second power conversion module #2 may be set to a second operating frequency (fpwm1−4*fac) lower than the operating frequency of the first power conversion module #1 by 4 times (4*fac) the frequency of the output AC power, an operating frequency of third power conversion module #3 may be set to the first operating frequency fpwm1 equal to the operating frequency of the first power conversion module, an operating frequency of fourth power conversion module #4 may be set to the second operating frequency (fpwm1−4*fac) equal to the operating frequency of the second power conversion module, and an operating frequency of fifth power conversion module #5 may be set to the first operating frequency fpwm1 equal to the operating frequency of the first power conversion module or the second operating frequency (fpwm1−4*fac) equal to the operating frequency of the second power conversion module. As another embodiment (case 10), an operating frequency of first power conversion module #1 may be set to a first operating frequency fpwm1, an operating frequency of second power conversion module #2 may be set to a second operating frequency (fpwm1+4*fac) higher than the operating frequency of the first power conversion module #1 by 4 times (4*fac) the frequency of the output AC power, an operating frequency of third power conversion module #3 may be set to the first operating frequency fpwm1 equal to the operating frequency of the first power conversion module, an operating frequency of fourth power conversion module #4 may be set to the second operating frequency (fpwm1+4*fac) equal to the operating frequency of the second power conversion module, and an operating frequency of fifth power conversion module #5 may be set to the first operating frequency fpwm1 equal to the operating frequency of the first power conversion module or the second operating frequency (fpwm1+4*fac) equal to the operating frequency of the second power conversion module.

Summarizing the example of FIGS. 5 to 10, in the first frequency regulating step, the frequency controller may regulate the difference among the operating frequencies of the plurality of power conversion modules so as to be m times (m=0, 2, 4, . . . ) the frequency of the output AC power, wherein the difference between operating frequencies of at least two power conversion modules among the plurality of power conversion modules may not be zero.

In another aspect, in the first frequency regulating step, the frequency controller controls each of the plurality of power conversion modules to operate at any one of the first operating frequency and the second operating frequency, wherein the difference between the first operating frequency and the second operating frequency may be even times the frequency of the output AC power. Particularly, when the difference between the first operating frequency and the second operating frequency is 2 times the frequency of the output AC power, the difference between the operating frequencies of the modules is small and it is effective to decrease the THD.

When there are n (n=even) number of power conversion modules, the frequency controller may control n/2 of the plurality of power conversion modules to be operated at the first operating frequency, and the remaining n/2 of the plurality of power conversion modules to be operated at the second operating frequency.

When there are n (n=odd) number of power conversion modules, the frequency controller may control (n−1)/2 of the plurality of power conversion modules to be operated at the first operating frequency, other (n−1)/2 of the plurality of power conversion modules to be operated at the second operating frequency, and the remaining one to be operated at the first operating frequency or second operating frequency.

Figure 10:
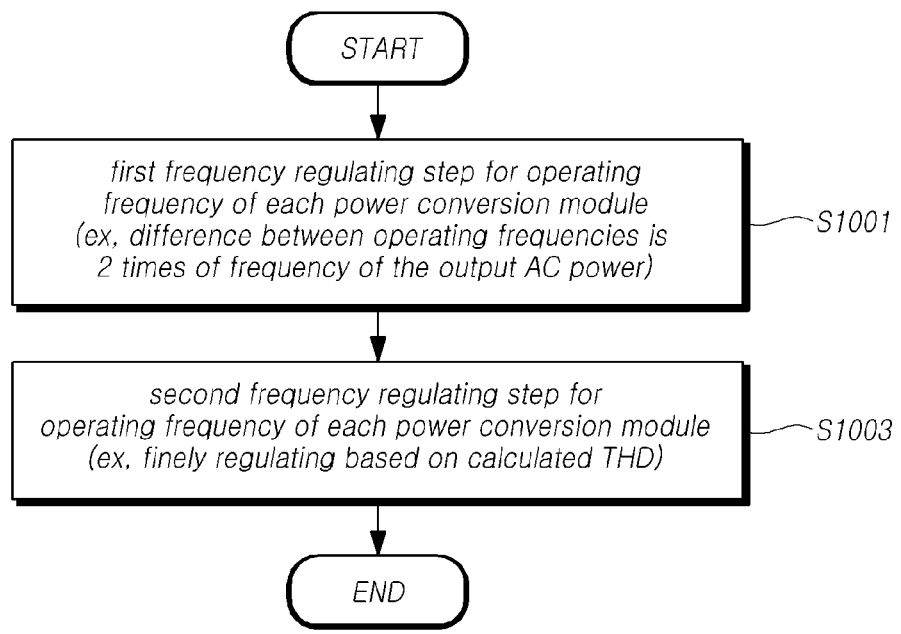
FIG. 10 illustrates a method for setting the operating frequency according to an embodiment of the present disclosure.

FIG. 10 illustrates a method for setting the operating frequency according to an embodiment of the present disclosure. The method for setting the operating frequency illustrated in FIG. 10 may be performed by the frequency controller illustrated in FIG. 1 and FIG. 2.

Referring to FIG. 10, the frequency controller may include functions as a first frequency regulating step S1001 and a second frequency regulating step S1003. For example, the frequency controller may control each of the plurality of power conversion modules to be operated at either the first operating frequency or the second operating frequency in the first frequency regulating step S1001. For example, the difference between the first operating frequency and the second operating frequency may be 2 times the frequency of the output AC power. For example, the frequency controller may obtain info Ration for a voltage or a current of the output AC power, calculate the THD (Total Harmonic Distortion) of the voltage or the current, and finely regulate each operating frequency of the plurality of power conversion modules to decrease the calculated THD. The variation of operating frequency of each power conversion module by the second frequency regulating step may be performed, for example, in a frequency range within ½ or ¼ of the frequency of the output AC power.

Figure 11:
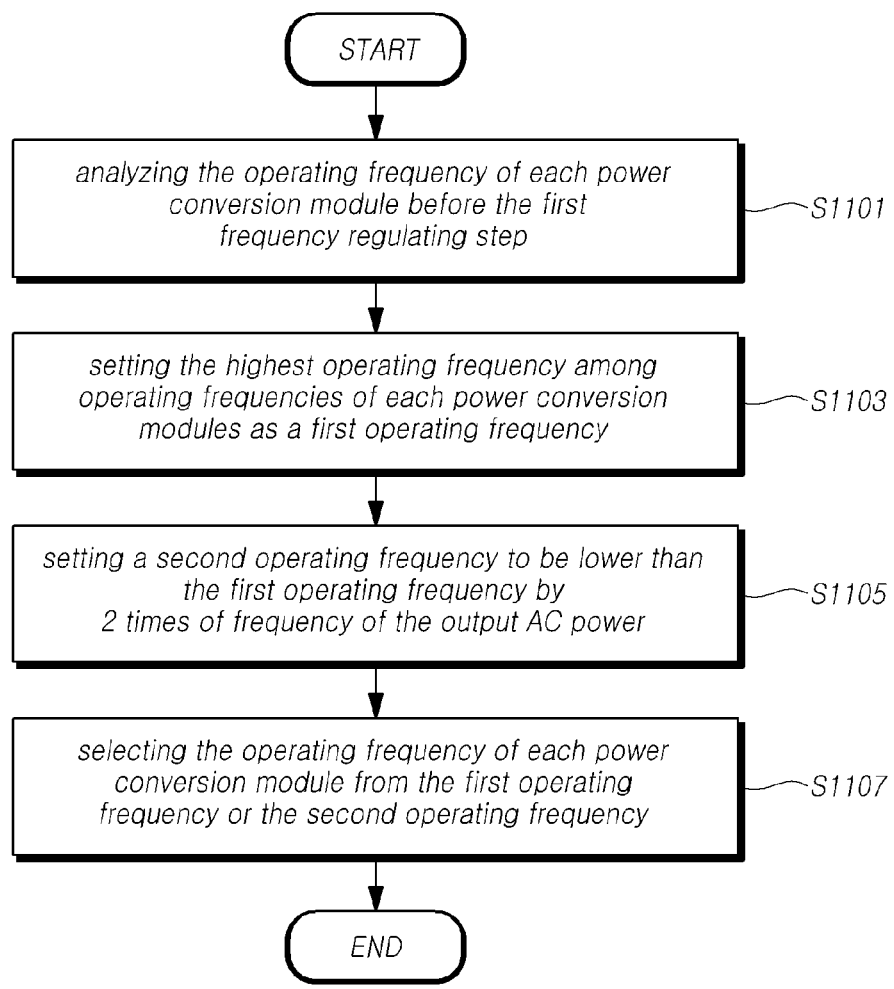
FIGS. 11 and 12 illustrate a method of first frequency regulating step according to an embodiment of the present disclosure.
Figure 12:
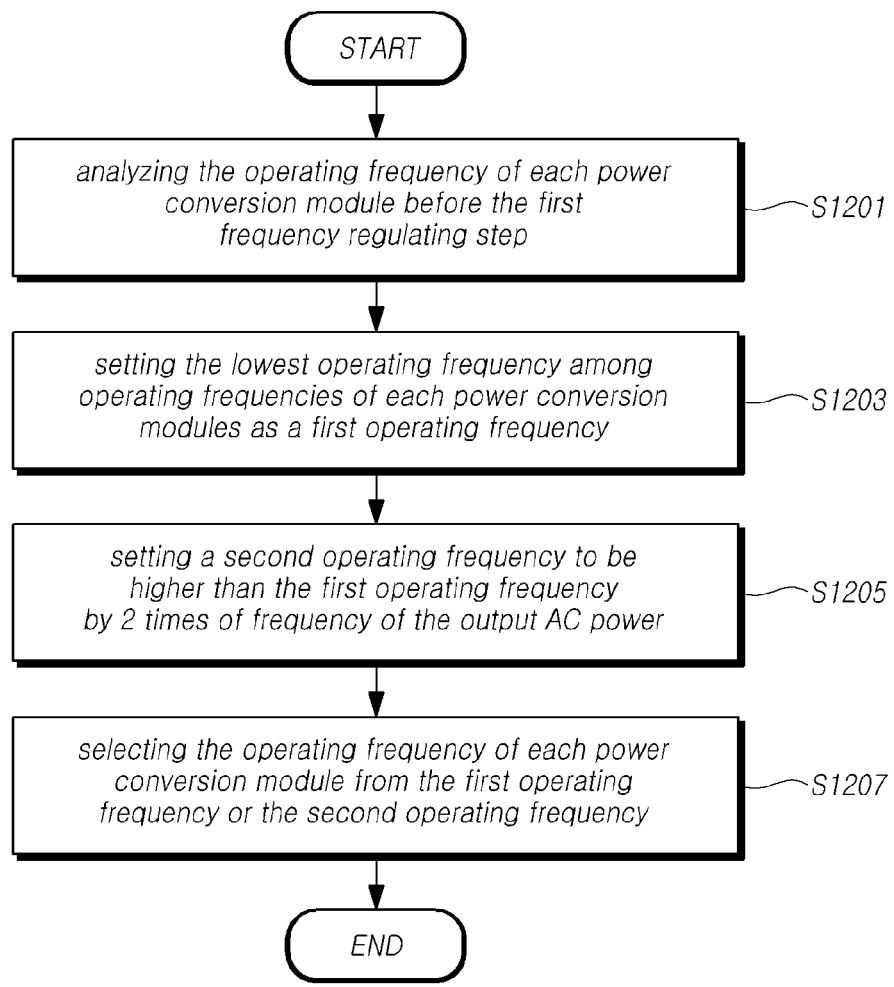

FIGS. 11 and 12 illustrate a method of first frequency regulating step according to an embodiment of the present disclosure.

Referring to FIG. 11, the frequency controller may analyze the operating frequency of each power conversion module before the first frequency regulating step S1101, set the highest operating frequency among operating frequencies of each power conversion modules as a first operating frequency S1103, set a second operating frequency to be lower than the first operating frequency by 2 times the frequency of the output AC power S1105, and select the operating frequency of each power conversion module from the first operating frequency or the second operating frequency S1107. The method for selecting the operating frequency of each power conversion module in S1107 may be considered with reference of FIGS. 5 to 9 above.

Referring to FIG. 12, the frequency controller may analyze the operating frequency of each power conversion module before the first frequency regulating step S1201, set the lowest operating frequency among operating frequencies of each power conversion modules as a first operating frequency S1203, set a second operating frequency to be higher than the first operating frequency by 2 times the frequency of the output AC power 51205, and select the operating frequency of each power conversion module from the first operating frequency or the second operating frequency S1207. The method for selecting the operating frequency of each power conversion module in S1207 may be considered with reference of FIGS. 5 to 9 above.

Figure 13:
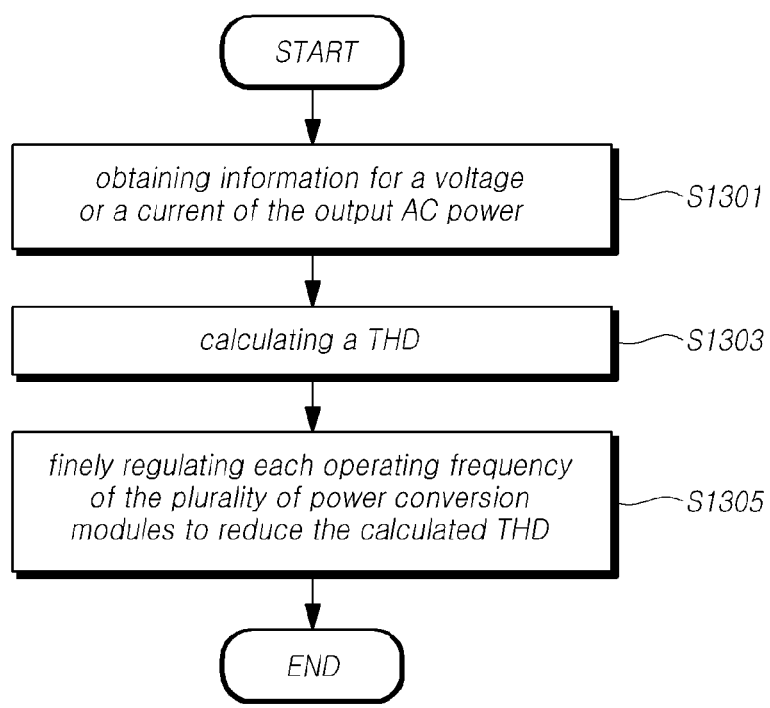
FIG. 13 illustrates a method of second frequency regulating step according to an embodiment of the present disclosure.

FIG. 13 illustrates a method of second frequency regulating step according to an embodiment of the present disclosure.

Referring to FIG. 13, the frequency controller may obtain information for a voltage or a current of the output AC power S1301, calculate a THD of the voltage or the current S1303, and finely regulate each operating frequency of the plurality of power conversion modules to decrease the calculated THD S1305.

The second frequency regulating step may complement the first frequency regulating step. Even if the frequency controller sets the operating frequency of each power conversion module through the first frequency regulating step, there is a possibility that the frequency is partially changed due to the deviation of the frequency generating circuit in each power conversion module. Also, the THD may vary to some extent depending on the magnitude of the load current. Therefore, the frequency controller may calculate the THD from information of the actual current or voltage and finely regulate the operating frequency of each power conversion module to minimize the THD through the second frequency regulating step. Since the second frequency regulating step performs a function to complement the first frequency regulating step, the variation of the operating frequency of each power conversion module by the second frequency regulating step may be within a frequency range of ½ or ¼ of the output AC power.

Figure 14:
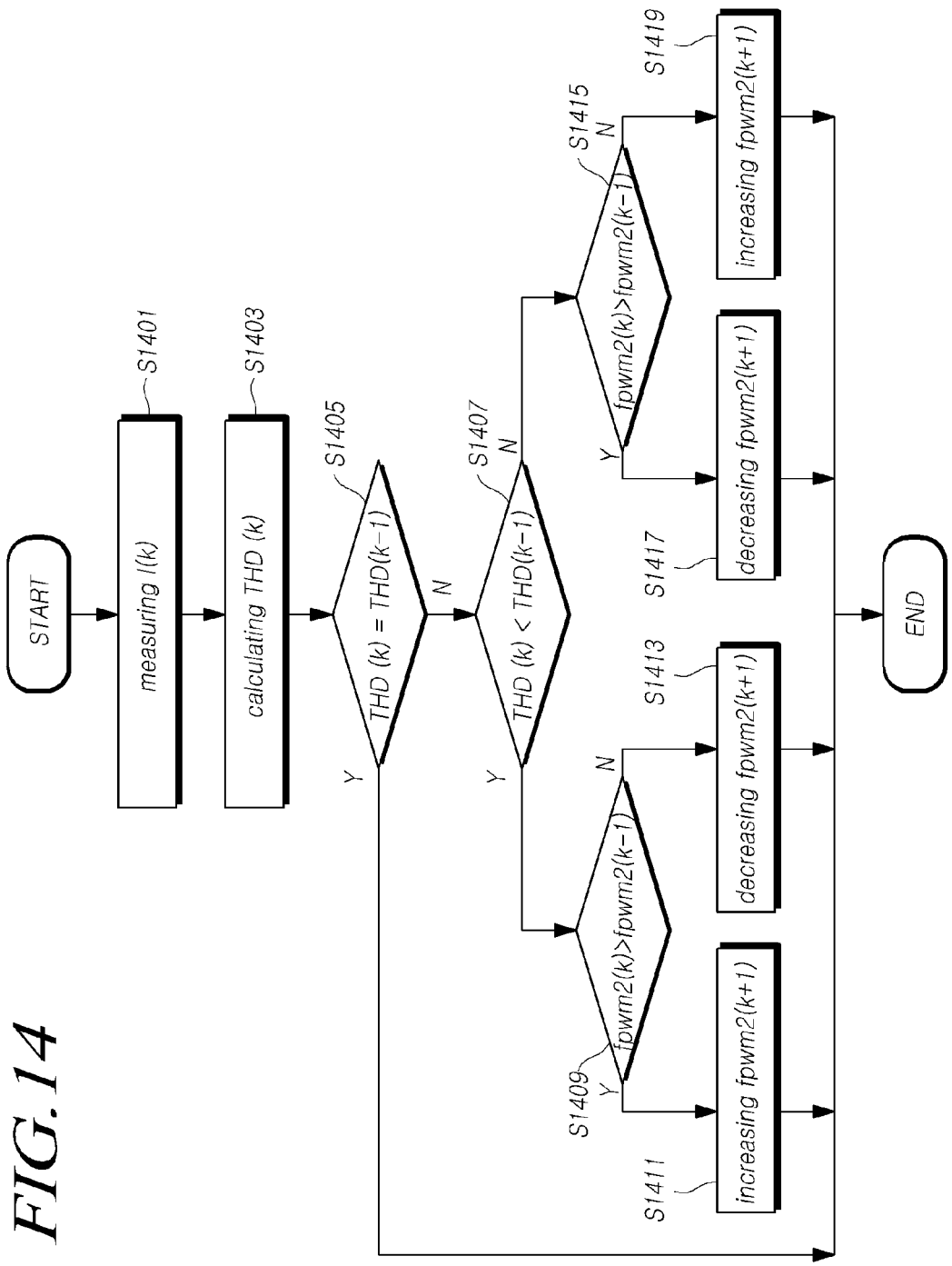
FIG. 14 illustrates a detailed procedure of second frequency regulating step according to an embodiment of the present disclosure.

FIG. 14 illustrates a detailed procedure of second frequency regulating step according to an embodiment of the present disclosure.

In S1401, information for the current I(k) of the output AC power may be obtained. Although information for the current I(k) of the output AC power is illustrated in FIG. 14, information for the voltage of the output AC power may be used as described above.

In S1403, THD may be calculated using the information for the current of the output AC power. The THD calculation using the information for the current of the output AC power may be performed by a conventional method, and the frequency controller may include logic elements such as a CPU and a microprocessor for this purpose.

In S1405, it may be determined whether present THD(k) and previous THD(k−1) are the same. Here, 'the same' may include not only a perfect equivalent but also a case where there is a difference in degree with no substantial change in the THD.

If it is determined in S1405 that there is a meaningful change between the present THD(k) and the previous THD(k−1), the process may proceed to S1407 so as to determine whether the present THD(k) has decreased comparing with previous THD(k−1).

If it is determined in S1407 that the present THD(k) is decreased comparing with the previous THD(k−1), the process may proceed to S1409 so as to determine whether the present second operating frequency fpwm2(k) has increased comparing with previous second operating frequency (fpwm2(k−1)).

If the present second operating frequency fpwm2(k) is increased comparing with the previous second operating frequency fpwm2(k−1) in S1409, the process may proceed to S1411 so as to increase the following second operating frequency fpwm2(k+1) comparing with the present second operating frequency fpwm2(k). That is, if the THD is decreased by increasing the present second operating frequency fpwm2(k) compared to the previous second operating frequency fpwm2(k−1), it may confirm that the THD will be additionally decreased by further increasing the following second operating frequency fpwm2(k+1).

If the present second operating frequency fpwm2(k) does not increase comparing with the previous second operating frequency fpwm2(k−1) in S1409, the process may proceed to S1413 so as to decrease the following second operating frequency fpwm2(k+1) comparing with the present second operating frequency fpwm2(k). That is, if the THD is decreased by decreasing the present second operating frequency fpwm2(k) compared to the previous second operating frequency fpwm2(k−1), it may confirm that the THD will be additionally decreased by further decreasing the following second operating frequency fpwm2(k+1).

If it is determined in S1407 that the present THD(k) is not decreased comparing with the just previous THD(k−1), the process may proceed to S1415 so as to determine whether the present second operating frequency fpwm2(k) is increased comparing with previous second operating frequency fpwm2(k−1)).

If the present second operating frequency fpwm2(k) is increased comparing with the previous second operating frequency fpwm2(k−1) in S1415, the process may proceed to S1417 so as to decrease the following second operating frequency fpwm2(k+1) comparing with the present second operating frequency fpwm2(k). That is, if the THD is increased by increasing the present second operating frequency fpwm2(k) compared to the previous second operating frequency fpwm2(k−1), it may confirm the variation of the THD by decreasing the following second operating frequency fpwm2(k+1).

If the present second operating frequency fpwm2(k) does not increase comparing with the previous second operating frequency fpwm2(k−1) in S1415, the process may proceed to S1419 so as to increase the following second operating frequency fpwm2(k+1) comparing with the present second operating frequency fpwm2(k). That is, if the THD is increased by decreasing the present second operating frequency fpwm2(k) compared to the previous second operating frequency fpwm2(k−1), it may confirm the variation of the THD by increasing the following second operating frequency fpwm2(k+1).

If it is determined in S1405 that there is no meaningful change between the present THD(k) and just previous THD (k−1), the process may be terminated without changing the second operating frequency fpwm2. That is, if there is no change in the THD despite of the perturbation of the second operating frequency fpwm2, the second operating frequency fpwm2 may not be changed because the changing direction of the second operating frequency fpwm2 is not determined.

In FIG. 14, the first operating frequency fpwm1 is maintained with the state by setting in the first frequency regulating step and the second operating frequency fpwm2 is regulated in the second frequency regulating step, but the embodiment of present disclosure is not limited to that. Alternatively, it is also possible to change only the first operating frequency fpwm1 or change the first operating frequency fpwm1 and the second operating frequency fpwm2 at the same time.

According to the method illustrated in FIG. 14, it is possible to prevent the THD from increasing due to a deviation of the frequency generating circuit or a change of the load current by finely regulating the operating frequency of each power conversion module to minimize the THD as a method that confirms the THD by perturbing the operating frequency of the power conversion module.

It is to be understood that the terms "comprise", "include", or "having" as used in the foregoing description mean that corresponding element may be embedded unless specifically stated to the contrary, so that it shall be construed that other element may be further inserted. All terms including technical and scientific teens have the same meaning as commonly understood by those skilled in the art to which present disclosure belongs, unless otherwise defined. Commonly used terms such as the terms defined in a dictionary shall be interpreted to be consistent with the contextual meanings of the related art, and are not to be construed as ideal or overly formal, unless especially defined in this description.

The above-described embodiments of the present disclosure have been described only for illustrative purposes, and those skilled in the art will appreciate that various modifications and changes may be made thereto without departing from the essential features of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. A power conversion device, comprising:
a plurality of power conversion modules being connected in parallel to receive input power and provide output AC power; and
a frequency controller configured to control each operating frequency of the plurality of power conversion modules,
wherein, the frequency controller includes a function as a first frequency regulating step for regulating each operating frequency of the plurality of power conversion modules, so that the operating frequencies of the plurality of power conversion modules have a specific relationship with each other,
wherein, in the first frequency regulating step, the frequency controller regulates a difference among the operating frequencies of the plurality of power conversion modules so as to be m times a frequency of the output AC power, where m is one of 0 or an even number, and
wherein a difference between operating frequencies of at least two power conversion modules among the plurality of power conversion modules is not zero.

2. The power conversion device of claim 1, wherein, in the first frequency regulating step, the frequency controller regulates the difference between the operating frequencies of the at least two power conversion modules among plurality of the power conversion modules so as to be 2 times the frequency of the output AC power.

3. A power conversion device, comprising:
a plurality of power conversion modules being connected in parallel to receive input power and provide output AC power; and
a frequency controller configured to control each operating frequency of the plurality of power conversion modules,
wherein, the frequency controller includes a function as a first frequency regulating step for regulating each operating frequency of the plurality of power conversion modules, so that the operating frequencies of the plurality of power conversion modules have a specific relationship with each other, and
wherein, in the first frequency regulating step, the frequency controller regulates each of the plurality of power conversion modules to be operated at any one of a first operating frequency or a second operating frequency, and a difference between the first operating frequency and the second operating frequency to be 2 times a frequency of the output AC power.

4. The power conversion device of claim 3, wherein, when there are n number of power conversion modules, where n is an even number, the frequency controller controls n/2 of the plurality of power conversion modules to be operated at the first operating frequency, and the remaining n/2 of the plurality of power conversion modules to be operated at the second operating frequency.

5. The power conversion device of claim 3, wherein, when there are n number of power conversion modules, where n is an odd number, the frequency controller controls $(n-1)/2$ of the plurality of power conversion modules to be operated at the first operating frequency, other $(n-1)/2$ of the plurality of power conversion modules to be operated at the second operating frequency, and the remaining one to be operated at the first operating frequency or the second operating frequency.

6. The power conversion device of claim 3, wherein, the frequency controller sets a highest operating frequency among the operating frequencies of the plurality of power conversion modules as the first operating frequency before the first frequency regulating step, and sets the second operating frequency to be lower than the first operating frequency by 2 times the frequency of the output AC power.

7. The power conversion device of claim 3, wherein, the frequency controller sets a lowest operating frequency among the operating frequencies of the plurality of power conversion modules as the first operating frequency before the first frequency regulating step, and sets the second operating frequency to be higher than the first operating frequency by 2 times the frequency of the output AC power.

8. The power conversion device of claim 1, wherein, the frequency controller includes a function as a second frequency regulating step which is performed by obtaining information for a voltage or a current of the output AC power, calculating a THD (Total Harmonic Distortion) of the voltage or the current, and finely regulating each operating frequency of the plurality of power conversion modules to decrease the calculated THD.

9. The power conversion device of claim 8, wherein, a variation of the operating frequency of each power conversion module by the second frequency regulating step is in a frequency range within ½ or ¼ of the frequency of the output AC power.

10. A frequency controller configured to control each operating frequency of a plurality of power conversion modules connected in parallel which receive input power and supply output AC power, the frequency controller comprising:
an information obtainer configured to obtain information for the output AC power; and
a frequency regulator configured to perform a first frequency regulating step for regulating each operating frequency of the plurality of power conversion modules so that each operating frequency of the plurality of power conversion modules have a specific relationship with each other,
wherein, in the first frequency regulating step, the frequency regulator regulates a difference among the operating frequencies of the plurality of power conversion modules so as to be m times a frequency of the output AC power, where m is one of 0 or an even number, and
wherein a difference between operating frequencies of at least two power conversion modules among the plurality of power conversion modules is not zero.

11. The frequency controller of claim 10, wherein, in the first frequency regulating step, the frequency regulator regulates the difference between the operating frequencies of the at least two power conversion modules among plurality of the power conversion modules so as to be 2 times the frequency of the output AC power.

12. A frequency controller configured to control each operating frequency of a plurality of power conversion modules connected in parallel which receive input power and supply output AC power, the frequency controller comprising:
an information obtainer configured to obtain information for the output AC power; and
a frequency regulator configured to perform a first frequency regulating step for regulating each operating frequency of the plurality of power conversion modules so that each operating frequency of the plurality of power conversion modules have a specific relationship with each other,
wherein, in the first frequency regulating step, the frequency regulator regulates each of the plurality of power conversion modules to be operated at any one of a first operating frequency or a second operating frequency, and a difference between the first operating frequency and the second operating frequency to be 2 times a frequency of the output AC power.

13. The frequency controller of claim 12, wherein, when there are n number of power conversion modules, where n is an even number, the frequency regulator regulates n/2 of the plurality of power conversion modules to be operated at the first operating frequency, and the remaining n/2 of the plurality of power conversion modules to be operated at the second operating frequency.

14. The frequency controller of claim 12, wherein, when there are n number of power conversion modules, where n is an odd number, the frequency regulator regulates $(n-1)/2$ of the plurality of power conversion modules to be operated at the first operating frequency, other $(n-1)/2$ of the plurality of power conversion modules to be operated at the second operating frequency, and the remaining one to be operated at the first operating frequency or the second operating frequency.

15. The frequency controller of claim 10, wherein, the frequency regulator includes a function as a second frequency regulating step which is performed by obtaining information for a voltage or a current of the output AC power, calculating the THD (Total Harmonic Distortion) of the voltage or the current, and finely regulating each operating frequency of the plurality of power conversion modules to decrease the calculated THD.

16. A method for controlling operating frequencies of a plurality of power conversion modules by a frequency controller connected in parallel which receive input power and supply output AC power, the method comprising:
performing a first frequency regulating step for controlling each of the plurality of power conversion modules to be operated at any one of a first operating frequency or a second operating frequency; and
performing a second frequency regulating step for obtaining information for a voltage or a current of the output AC power, calculating a THD (Total Harmonic Distortion) of the voltage or the current, and finely regulating each operating frequency of the plurality of power conversion modules to decrease the calculated THD,
wherein, a difference between the first operating frequency and the second operating frequency is 2 times a frequency of the output AC power.

17. The method for controlling operating frequencies of claim 16, wherein, in the first frequency regulating step, the frequency controller sets a highest operating frequency among the operating frequencies of the plurality of power conversion modules as the first operating frequency before the first frequency regulating step, and sets the second operating frequency to be lower than the first operating frequency by 2 times the frequency of the output AC power.

18. The method for controlling operating frequencies of claim 16, wherein, in the first frequency regulating step, the frequency controller sets a lowest operating frequency among the operating frequencies of the plurality of power conversion modules as the first operating frequency before the first frequency regulating step, and sets the second operating frequency to be higher than the first operating frequency by 2 times the frequency of the output AC power.

19. The method for controlling operating frequencies of claim 16, wherein, a variation of an operating frequency of each power conversion module by the second frequency regulating step is in a frequency range within ½ or ¼ of the frequency of the output AC power.

20. The power conversion device of claim 3, wherein, the frequency controller includes a function as a second frequency regulating step which is performed by obtaining information for a voltage or a current of the output AC power, calculating a THD (Total Harmonic Distortion) of the voltage or the current, and finely regulating each operating frequency of the plurality of power conversion modules to decrease the calculated THD.

21. The frequency controller of claim 12, wherein, the frequency regulator includes a function as a second frequency regulating step which is performed by obtaining information for a voltage or a current of the output AC power, calculating the THD (Total Harmonic Distortion) of the voltage or the current, and finely regulating each operating frequency of the plurality of power conversion modules to decrease the calculated THD.

* * * * *